US006678228B1

(12) United States Patent
Kando et al.

(10) Patent No.: US 6,678,228 B1
(45) Date of Patent: Jan. 13, 2004

(54) METHOD AND APPARATUS FOR RECORDING INFORMATION IN WHICH THE AVERAGE POWER OF A PULSE IS ADJUSTED ACCORDING TO CONTROL DATA

(75) Inventors: Hidehiko Kando, Matsudo (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,159

(22) Filed: Feb. 29, 2000

(30) Foreign Application Priority Data

Apr. 13, 1999 (JP) .......................................... 11-104883

(51) Int. Cl.[7] ............................................... G11B 7/125
(52) U.S. Cl. ................................. 369/47.51; 369/59.12
(58) Field of Search ............................ 369/47.5, 47.51, 369/47.53, 59.11, 59.12

(56) References Cited

U.S. PATENT DOCUMENTS

| | | | | |
|---|---|---|---|---|
| 5,148,233 A | * | 9/1992 | Imamura et al. | 356/243 |
| 5,737,301 A | * | 4/1998 | Miyamoto et al. | 369/116 |
| 5,745,467 A | | 4/1998 | Sakaue et al. | |
| 5,790,512 A | * | 8/1998 | Put et al. | 369/275.4 |
| 6,229,785 B1 | * | 5/2001 | Kitaura et al. | 369/275.4 |
| 6,312,779 B1 | * | 11/2001 | Hirotsune et al. | 428/64.1 |
| 6,343,056 B2 | * | 1/2002 | Miyamoto et al. | 369/59.11 |
| 6,396,792 B1 | * | 5/2002 | Ichihara | 369/116 |
| 6,400,673 B1 | * | 6/2002 | Shigemori | 369/116 |

FOREIGN PATENT DOCUMENTS

| | | |
|---|---|---|
| EP | 0737962 | 10/1996 |
| EP | 0762400 | 3/1997 |
| EP | 0803866 | 10/1997 |
| EP | 0902424 | 3/1999 |
| EP | 0978827 | 2/2000 |
| WO | 98/36411 | 8/1998 |

OTHER PUBLICATIONS

Patent Abstrats of Japan, vol. 1998, No. 3, Feb. 27, 1998 (JP 09 305973 A, Nov. 28, 1997).

* cited by examiner

*Primary Examiner*—Gautam R. Patel
(74) *Attorney, Agent, or Firm*—Antonelli, Terry, Stout & Kraus, LLP

(57) ABSTRACT

A method of and apparatus for recording information are disclosed, which obviate the problem that the average power of the middle pulse chain cannot be controlled simply by controlling the two pulse levels of the middle pulse chain in an energy beam for recording the information. The energy beam is multi-pulsated and radiated on the recording medium for forming a recording mark. The average power of the middle pulse chain is measured and set to a predetermined value. As a result, the average power of the first pulse, the middle pulse chain and the last pulse of the multi-pulse chain can be accurately controlled.

2 Claims, 2 Drawing Sheets

A) NRZI SIGNAL
B) THE SHAPE OF LIGHT-PULSE
PEAK POWER
BIAS POWER 1
BIAS POWER 2
BIAS POWER 3
TIME
BIAS POWER 2 DURALATION
MONO PULSE
WRITE PULSE
LUST PULSE
MULTI PULSE CHAIN
FIRST PULSE
$T_{ELP}$
$T_{LC}$
$T_{SFP}$
$T_{LP}$
$T_{SLP}$
$T_{MP}$
$T_{EFP}$
$T_{FP}$
$T_{SFR}$

METHOD AND APPARATUS FOR RECORDING INFORMATION IN WHICH THE AVERAGE POWER OF A PULSE IS ADJUSTED ACCORDING TO CONTROL DATA

BACKGROUND OF THE INVENTION

The present invention relates to a method of and an apparatus for recording information using an information recording-medium capable of recording information by radiation of an energy beam, or in particular to a method of recording information high in compatibility and accuracy.

A DVD-RAM for realizing a memory capacity of 2.6 GB on one side of a disk 120 mm in diameter using a phase-change material finds practical applications. In forming a recording mark on this disk, the power of an energy beam is changed between high and low levels while the portions (space portions) of the medium between recording marks are irradiated with an energy beam of a predetermined different power level. Specifically, a multi-pulse energy beam is radiated for forming a recording mark and includes (except for short recording marks) four types of pulses, i.e. a first pulse, a multi-pulse chain (middle pulse chain), a last pulse and a negative pulse following the last pulse. This recording method has the advantage that what is called the overwriting (rewriting by overwriting) is possible in which new information is recorded while erasing the existing information. The power level of the energy beam is recorded beforehand in the control data of the recording medium, and the actual radiation power of the energy beam is determined based on this information.

In the prior art described above, the energy amount contained in the middle pulse chain depends on not only the high and low power levels of the middle pulse chain but also the duty factor of the middle pulse chain. Therefore, the energy amount contained in the middle pulse chain cannot be fully controlled simply by setting the high and lower power levels of the middle pulse chain to a predetermined value. For this reason, a recording mark is not necessarily formed to the correct shape by the middle pulse chain, often deteriorating the compatibility of recording. Especially in the case where information is recorded with high density in a 4.7 GB DVD-RAM, an insufficient energy amount in the middle portion of the recording mark under unstable control forms a recording mark with a thin middle portion, or an insufficient magnitude of the rear portion of the recording mark, thereby causing an unrequired edge shift in the reproduction signal and thus an insufficient compatibility for recording and reproduction. An excessively large energy amount resulting from an unstable control of the middle portion of the recording mark, on the other hand, forms a recording mark with a thick middle portion or with an excessively large rear portion, and generates an unrequired edge shift in the reproduction signal, thereby leading to the problem of an insufficient compatibility for recording and reproduction.

SUMMARY OF THE INVENTION

According to one aspect of the invention, there is provided a method of recording information for forming each recording mark in a recording medium by radiating a pulse chain of an energy beam including a first pulse, a middle pulse chain, a last pulse and a negative pulse following the last pulse, comprising the steps of:

recording the designated values of the power level of the first pulse, the upper and lower power levels of the middle pulse chain, the power level of the last pulse and the power level of the negative pulse in a control data zone of the recording medium in advance;

adjusting the average power of the first pulse to the designated power level value of the first pulse in the control data zone;

adjusting the average power of the middle pulse chain to the arithmetic mean of the designated upper power level value and the designated lower power level value in the control data zone;

adjusting the average power of the last pulse to the designated power level of the last pulse in the control data zone;

adjusting the average power of the negative pulse to the designated power level of the negative pulse in the control data zone; and adjusting the variation of the power level of the energy beam of the middle pulse chain to the difference between the designated upper power level and the designated lower power level in the control data zone.

According to another aspect of the invention, there is provided an apparatus for controlling the ratio of the average power between the first pulse, the middle pulse chain and the last pulse to a predetermined value.

DESCRIPTION OF THE PREFERRED EMBODIMENTS

Figure 1:
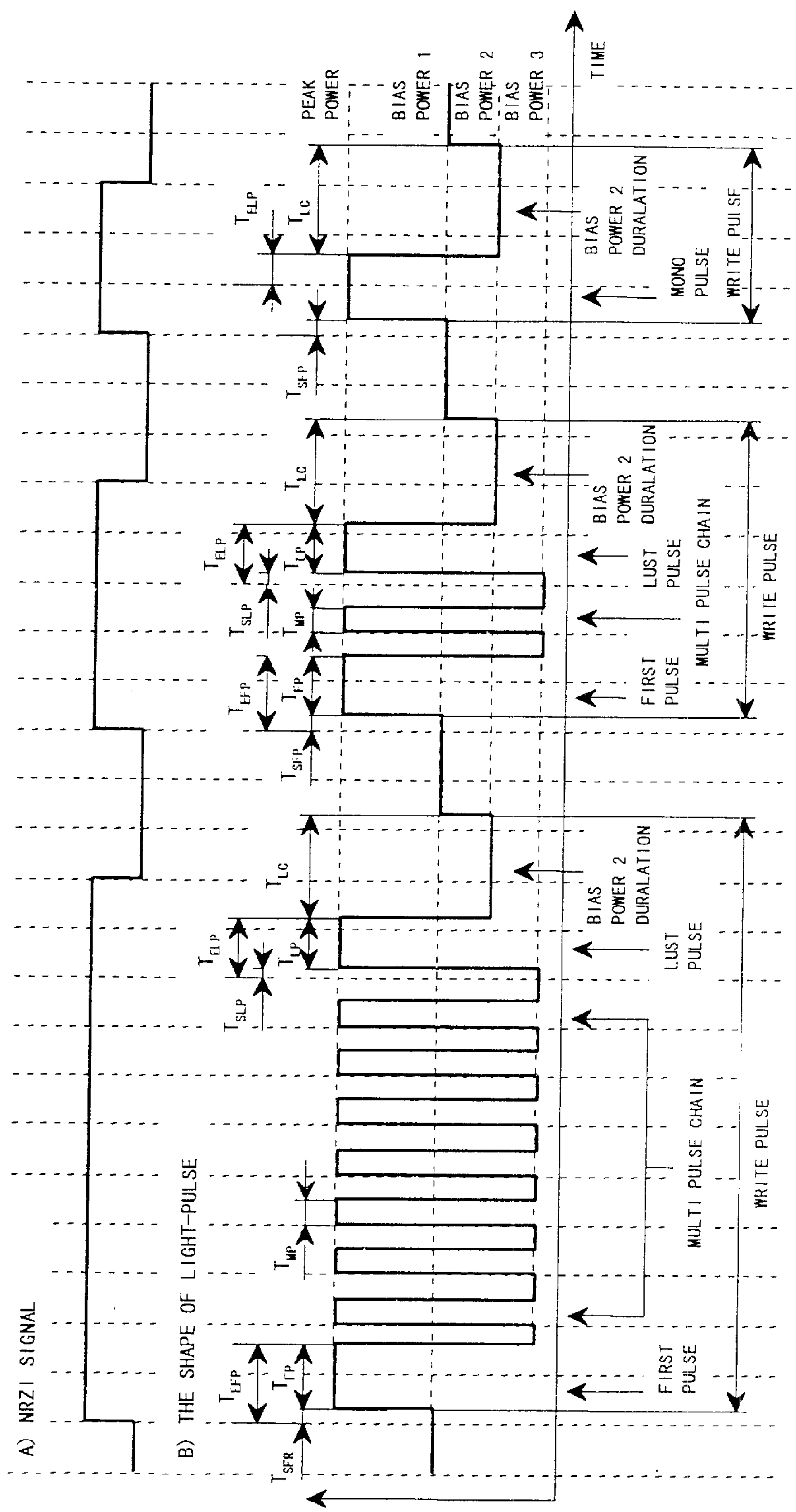
FIG. 1 is a diagram showing an example of time-sequential change of the power level of the energy beam radiated on a recording medium when information is recorded in the medium.

First, an example of time-sequential change of the power level of the energy beam radiated on a recording medium for recording information therein will be explained with reference to FIG. 1. The manner in which the power level is changed in time-sequential fashion when recording information will be generally called a write strategy or a recording strategy. Take a DVD-RAM as an example. In the case of DVD-RAM, the shortest mark or the shortest space has a length of 3T (three times as long as the time T), where T is the time width of the reference clock for recording and reproduction. Normally, the longest mark or space has a length of 11T, although a special pattern has a length of 14T.

A NRZI signal constituting information to be recorded chronologically on a recording medium, when supplied, is converted into a temporal change of the power level of the energy beam by an appropriate signal processing circuit. This temporal change of the power level is indicated as an optical pulse waveform in FIG. 1. The power is set to four levels including the peak power, the bias power 1, the bias power 2 and the bias power 3. The recording medium can be transferred to a first state in bias power 1, and to a second state in peak power. The bias power 3 is a level equal to or lower than the bias power 1. When forming an area of second state 4T or longer (i.e. with the NRZI signal 4T or longer) in the recording medium, a period of bias power 3 in power level is mixed in the radiation period of the peak power thereby to multi-pulsate the energy beam. Of the multi-pulsated energy beam, the first light pulse is called the first pulse and the last light pulse the last pulse. Between the first and last pulses, the light pulse alternating between peak power and bias power 3 is repeated in accordance with the length of the NRZI signal. The number of alternations, i.e. repetitions is given as (n−4) where n is the length of the NRZI signal and larger than 3. The whole repetitive pulses interposed between the first and last pulses are called the middle pulse chain. Also, a negative pulse holding the power level of bias power 2 is radiated following the last pulse. The bias power 2 is set to a level equal to or lower than the bias power 1. Thus, when forming an area in second state corresponding to the NRZI signal having a length of 5T or more, the recording pulses include the first pulse, the middle pulses, the last and the negative pulse. When forming an area in second state corresponding to the NRZI signal having a length of 4T or more, on the other hand, the recording pulses include the first pulse, the last and the negative pulse. Also, when forming an area in second state corresponding to the NRZI signal having a length of 3T, the recording pulse includes a single light pulse (first pulse or a single pulse) and the negative pulse.

The reference values of the peak power, bias power 1, bias power 2 and bias power 3 may be recorded in advance at an appropriate place in the recording medium as medium information. The portion of the recording medium where the medium information on the recording strategy is called the information track of the control data zone. The reference value of the power level is read from the information track of the control data zone of the recording medium, and with reference to the particular reference value, each power level is determined for the write operation. The designated value of the power level of the first pulse is the peak power, the designated value of the upper power level of the middle pulse chain is the peak power while the designated value of the lower power level thereof is the bias power 3, the designated value of the power level of the last pulse is the peak power, and the designated value of the power level of the negative pulse is the bias power 2. The temporal designated value of these pulses may be also recorded in the information track.

First, consider the case in which an area in second state corresponding to the NRZI signal having a length of at least 4T is formed in a recording medium, and let us define the recording waveform. The leading edge of the first pulse in the write pulse chain is defined at the time point following the lapse of time $T_{SFP}$ from the leading edge of the NRZI signal, and the trailing edge of the first pulse in the write pulse chain is defined at the time point following the lapse of time $T_{EFP}$ from the leading edge of the NRZI signal. The length of the first pulse is $T_{FP}$ which is equal to the difference between $T_{EFP}$ and $T_{SFP}$. The leading edge of the last pulse in the write pulse chain occurs at the time point following the lapse of time $T_{SLP}$ from the reference time point earlier by 2T from the trailing edge of the NRZI signal. The trailing edge of the last pulse in the write pulse chain, on the other hand, occurs at the time point following the lapse of time $T_{ELP}$ from the reference time point earlier by 2T from the trailing edge of the NRZI signal. The length of the last pulse is $T_{LP}$ and is equal to the difference between $T_{ELP}$ and $T_{SLP}$.

There may exist a middle pulse chain between the first pulse and the last pulse. The leading edge of each pulse in the middle pulse chain coincides with the reference clock position, and the trailing edge of each pulse occurs at the time point following the lapse of time $T_{MP}$ from the trailing edge of each pulse.

Now, consider the case in which an area in second state corresponding to the NRZI signal of 3T is formed in a recording medium. The leading edge of the light pulse occurs at the time point following the lapse of $T_{SFP}$ from the leading edge of the NRZI signal. The trailing edge of the light pulse, on the other hand, occurs at the time point following the lapse of time $T_{ELP}$ from the reference time point earlier by 2T from the trailing edge of the NRZI signal.

There is a portion having a power level of bias power 2 following the last pulse of the recording pulse chain 4T or longer or following the recording pulse of 3T, which portion has a length of $T_{LC}$.

The reference values of the time points $T_{SFP}$, $T_{EFP}$, $T_{FP}$, $T_{SLP}$, $T_{ELP}$, $T_{LP}$, $T_{LC}$ and $T_{MP}$ for defining the recording pulses are read from the information track of the control data zone of the recording medium, and by reference to these reference values, the values of these time points are determined.

The time points $T_{SFP}$, $T_{EFP}$, $T_{FP}$, $T_{SLP}$, $T_{ELP}$, $T_{LP}$, $T_{LC}$ and $T_{MP}$ for defining the recording pulses do not always assume a predetermined value, but may be required to be changed in accordance with the combination of the NRZI signals. Consider the case of a DVD-RAM having a capacity of 4.7 GB on one side in particular. The shortest mark of 3T has a length of about 0.42 microns which is shorter than the write spot radius of 0.45 microns. In this high-density recording operation, the thermal interference between adjoining marks increases to such an extent that it is difficult to assure an always stable recording operation. An idea conceived to overcome this inconvenience is to change the recording waveform adaptively in accordance with the combination of the portions before and after the NRZI signal. The following two methods are available for correcting the shift of the front edge.

1) To change $T_{SFP}$ while fixing $T_{EFP}$. In the process, $T_{FP}$ changes with $T_{SFP}$.

2) To change $T_{SFP}$ while fixing $T_{FP}$. In the process, $T_{EFP}$ changes with $T_{SFP}$.

On the other hand, the following two methods are employed for correcting the shift of the rear edge.

1) To change $T_{ELP}$ while fixing $T_{SLP}$. In the process, $T_{LP}$ changes with $T_{ELP}$.

2) To change $T_{ELP}$ while fixing $T_{LP}$. In the process, $T_{SLP}$ changes with $T_{ELP}$.

Which of the above-mentioned methods is selected for controlling the front edge and the rear edge depends on the manner in which the recording medium is designed and the recording characteristics of the recording medium. Which method is to be selected for controlling the shift of the front edge or the rear edge is best understood by the manufacturer of the recording medium, and therefore such a manufacturer can recommend to the information recording apparatus as to which method should be selected for controlling the edge shift. Specifically, the manufacturer of the recording medium writes a recommendation of an edge shift control method at a specified place on the recording medium. This information is read by the information recording apparatus thereby to determine a method of controlling the edge shift. In such a case, the medium characteristics intended for by the recording medium manufacturer can be fully utilized by the information recording apparatus, and therefore a most stable information recording is made possible. Also, the recording medium manufacturer prepares a look-up table for edge shift control and records it in the recording medium. This look-up table is read by the information recording apparatus, and by referring to it, the edge shift is controlled. In this way, all the medium characteristics intended for by the recording medium manufacturer can be utilized by the information recording apparatus, and thus a most stable information recording is made possible. These ideas can provide means for securing the best compatibility of the recording with high recording density.

Let M(n) be the length of a mark to be recorded, and S(n−1) be the length of the space leading the mark. The look-up table for the front edge is a series of values determined by the combinations of M(n) and S(n−1) which values can be either positive or negative.

Let M(n) be the length of a mark to be recorded, and S(n+1) be the length of the space following the mark. The look-up table for the rear edge is a series of values determined by the combinations of M(n) and S(n+1) which values can be either positive or negative.

As described above, the mark edge position can be controlled always accurately by changing $T_{SFP}$ and $T_{ELP}$ in accordance with the combinations of the portions before and after the NRZI signal.

The compatibility of the recording of the information using the aforementioned recording strategy will be discussed below.

Assume that the recording compatibility is defined as the fact that a stable write operation can be performed with a similar write strategy between different apparatuses and the recording marks written by the apparatuses can be read as a reproduction signal having a similar characteristic. With a writable optical disk apparatus, it is essential to have a recording compatibility, as well as a reproduction compatibility, to realize the interchangeability of the information medium. This in turn requires the following conditions.

1) The recording waveform has no excessive overshoot or undershoot.

2) The energy amount contained in each of the first pulse, the middle pulses, the last pulse and the negative pulse (or an average power level of the pulses, which is given as the energy contained in a pulse divided by the pulse holding time) is controlled to a predetermined value.

3) The energy beam for holding the power level of bias power 1 is supplied in stable manner and the value of bias power 1 is controlled to a predetermined value, or the average power is controlled to a predetermined value during the period when the level of bias power 1 is held.

In a phase-change medium like the DVD-RAM, the condition (2) above is especially important for securing the recording compatibility. Specifically, the first pulse has the function of starting the melting of the recording film by radiating a large average power on the recording medium, and the middle pulses have the function of continuing the melting of the recording film with a comparatively low average power. On the other hand, the last pulse applies a rather large average power to secure a stable shape of the rear portion of the recording mark, while the negative pulse of a small average power following the last pulse is used to stabilize the shape of the rear portion of the recording mark. In this way, the recording pulses including the first pulse, the middle pulses, the last pulse and the pulse for holding the level of bias power 3 have different functions, and therefore the values thereof or the ratio of the values thereof are required to be accurately controlled.

In an actual recording apparatus, the radiation energy amount of the energy beam is varied with the temperature changes or the like. First of all, therefore, the ratio of average power is controlled between the first pulse, middle pulses, the last pulse and the negative pulse, and then while holding the ratio, the whole power level is changed to determine an optimum power. By doing so, it is always possible to accurately determine the recording pulse capable of realizing a recording mechanism suitable for the recording medium. To the extent that the radiation energy amount remains unchanged, however, the average power of each of the first pulse, the middle pulse chain, the last pulse and the negative pulse can be controlled.

The recording compatibility can be substantially secured if the average power of each pulse as described in (2) above is controlled to about ±5% in terms of an error from a value to be set. As long as the average power is controlled this way, the overshoot or undershoot described in (1) above is allowable to about ±10% of the power level to be set or to about ±10% of the power level change. The recording pulses are a pulse chain very high in speed, and therefore an overshoot or an undershoot is liable to occur. As far as the condition (2) above is met, however, a large allowance of (1) above can be given and thus the apparatus design is facilitated. This makes it possible to realize a recording apparatus having a stable performance and to perform the recording/reproduction in stable fashion with a high compatibility. As for the condition (3) above, on the other hand, the bias power 1 is a quasi-DC level existing between a given multi-pulse chain and the following multi-pulse chain, and it is not very difficult to hold the accuracy of the bias power 1 at the accuracy of about ±5%.

Even when the average power of the middle pulse chain is set to a predetermined value, the width of change of the power level of the middle pulse chain is not always secured due to the overshoot or undershoot. For a phase-change recording medium such as the DVD-RAM, even if the average power of the middle pulse chain is set to a predetermined value, the middle portion of the recording mark cannot be formed with a sufficient accuracy in the case where the change width of the power level is excessively large or excessively small. The designated value of the change width of the power level of the middle pulse chain is the difference between the designated peak power value and the designated value of bias power 3. In the actual recording waveform, however, an error of up to about ±20% from the designated value is allowed for the change width of the power level of the middle pulse chain. As a result, once the average power of the middle pulse chain is adjusted to the accuracy of ±5% from the designated value, an error of up to about 10% from the designated value can be allowed for the upper power and the lower power, respectively, of the middle pulse chain.

A sufficient recording compatibility can be maintained by setting the following target values of the average power of the respective pulses. Specifically, the average power level of the first pulse is set to the designated peak power value ±5%, the average power level of the middle pulse chain is set to the designated middle power level ±5% when the designated middle power is defined as 0.5×(designated peak power value+designated value of bias power 3), the average power level of the last pulse is set to the designated peak power value ±5%, and the average power level of the negative pulse is set to the designated value of bias power 2±5%. The designated values of the peak power, bias power 1, bias power 2 and bias power 3 may be recorded in the control data of the recording medium, in which case they can be read and used.

Even when adjusting the ratio of each pulse in advance, the power of each pulse is set as described above first of all. Then, the power of each pulse is changed in such a manner as not to change the ratio of average power between these pulses, and thus the optimum power is determined.

From the temporal change of the power actually radiated on the recording medium, the following method is proposed as one of the methods of determining the average power level of the first pulse. Specifically, assume that the line representing X% of the power level to be set is crossed first upward by the level of the first pulse at the time point 1 and the line representing X% of the power level to be set is first crossed downward by the level of the first pulse at the time point 2. The power levels of these two time points are integrated with each other, and the result is divided by the integration time to obtain the average power of the first pulse. In this method, X% may be 90%, 95% or otherwise can be set according to the conditions of the apparatus.

From the temporal change of the power actually radiated on the recording medium, on the other hand, the following method is proposed as one of the methods of determining the average power level of the middle pulses. In view of the fact that the middle pulses are generated only in a recording mark not less than 5T in length, the description below is limited to the recording mark not less than 5T in length. Assuming that the length of the NRZI signal is nT (n>4), consider the time-sequential change for (n−4)T. Consider two time points, time point 1 and time point 2 distant from each other by two time-sequential changes. These time points are set in such a manner as to contain all the middle pulses between them. The power level between the two time points is integrated, and the result is divided by the integration time thereby to determine the average power level of the middle pulses.

From the temporal change of the power actually radiated on the recording medium, the following method is proposed as one of the methods of determining the average power level of the last pulse. Specifically, assume that the line representing Y% of the power level to be set is crossed first upward by the level of the last pulse at the time point 1 and the line representing Y% of the power level to be set is last crossed downward by the level of the last pulse at the time point 2. The power level between these two time points is integrated and the result is divided by the integration time to obtain the average power of the last pulse. In this method, Y% may be 90%, 95% or otherwise can be set according to the conditions of the apparatus.

From the temporal change of the power actually radiated on the recording medium, the following method is proposed as one of the methods of determining the average power level of the negative pulse. Specifically, assume that the line representing Z% of the power level to be set is crossed first downward by the level of the negative pulse at the time point 1 and the line representing Z% of the power level to be set is last crossed upward by the level of the negative pulse at the time point 2. The power level between these two time points is integrated and the result is divided by the integration time to obtain the average power level of the negative pulse. In this method, Z% may be 110%, 105% or otherwise can be set according to the conditions of the apparatus. In the case where the bias power 2 and the bias power 1 are at the same level or have only a small difference, however, the time point 2 may be difficult to define. In such a case, the time point 2 is regarded as the time point following the lapse of the time required to hold the bias power level 2 from the time point 1. Then, the power level between the time points 1 and 2 is integrated, and the result is divided by the integration time thereby to determine the average power of the negative pulse.

From the temporal change of the power actually radiated on the recording medium, the following method is proposed as one of the methods of determining the average power level of the bias power 1. Specifically, assume that the time point 2 is the one used for determining the average power level of the negative pulse and the time point 3 is the one at which the line representing W% of the power level to be set is last crossed upward by the level of the bias power 1. The power level between these two time points 2 and 3 is integrated, and the result is divided by the integration time to obtain the average power of the bias power 1. In this method, W% may be 110%, 105% or otherwise can be determined according to the conditions of the apparatus. However, the holding time of the bias power 1 is so long that if the power is determined from the average power, the comparatively slow power change adversely affecting the erase characteristic cannot be suppressed. It is therefore necessary to take care to reduce such a power change.

Figure 2:
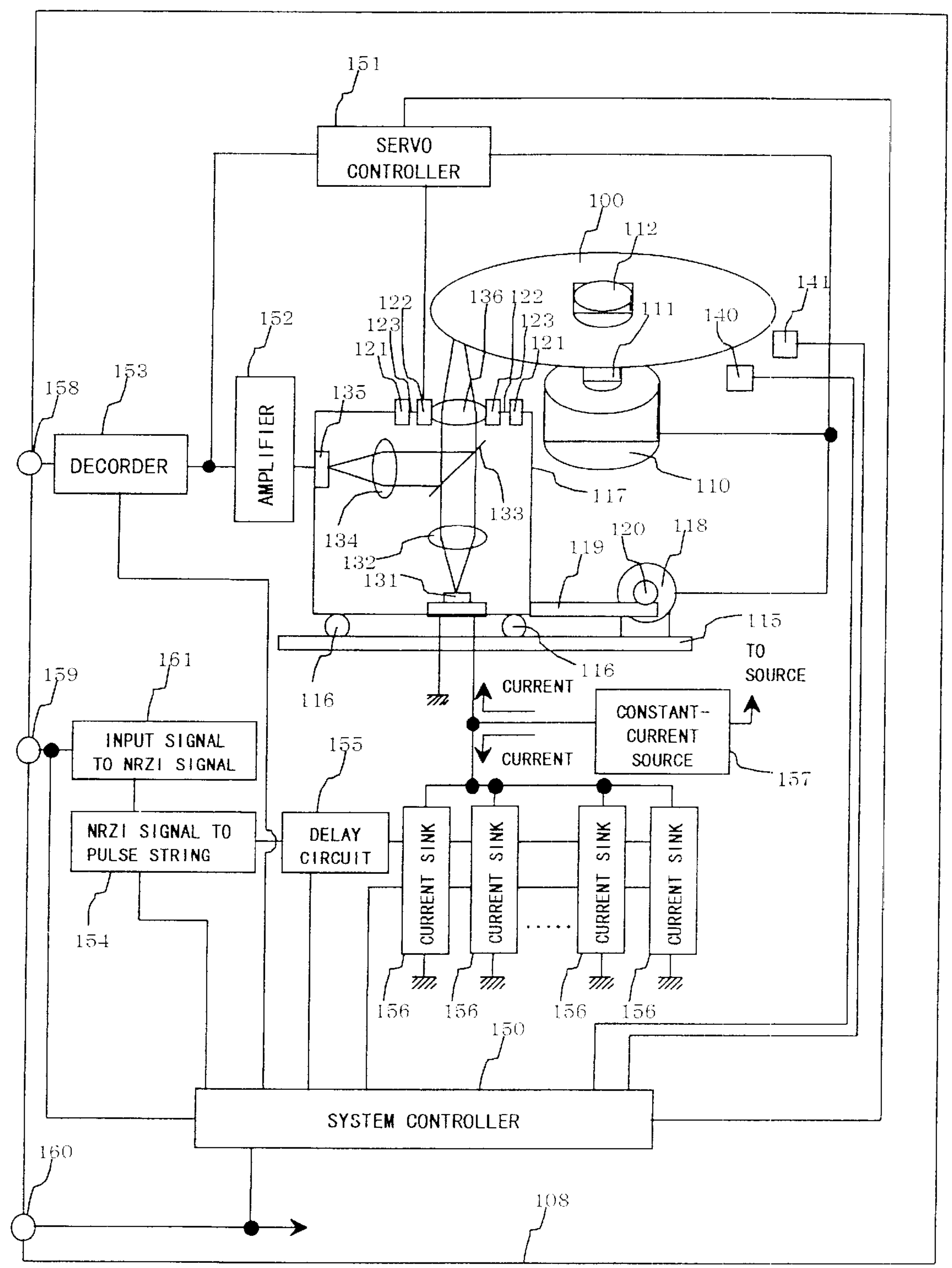
FIG. 2 is a diagram showing a configuration of an information recording apparatus.

Another embodiment of the invention will be explained with reference to FIG. 2. FIG. 2 is a block diagram showing an information storage apparatus. By way of explanation, the information storage apparatus with a recording medium 100 mounted thereon is shown. For storing information, the recording medium 100 is essential. The recording medium 100, however, is removed from or mounted on the information storage apparatus as required.

In FIG. 2, a chucking mechanism 112 for holding the recording medium 100 is mounted on the rotary shaft 111 of a motor 110 mounted on a box 108. The chucking mechanism 112 thus constitutes a holding mechanism of the recording medium 100. Also, the motor 110, the rotary shaft 111 and the chucking mechanism 112 make up a moving mechanism for moving the recording medium 100 and the energy beam relatively to each other.

A rail 115 is mounted on the box 108. A pair of rail guides 116 guided by a rail 114 are mounted on the case 117. Also, a linear gear 119 is mounted on the case 117, and a rotary gear 120 is mounted on the linear gear 119. The turning effort of the rotary motor 118 mounted on the box 108 is transmitted to the rotary gear 120 so that the case 117 linearly moves along the rail 115. The direction of this linear motion is substantially along the radius of the recording medium 100.

A magnet 121 is mounted on the case 117. An objective lens 136 is mounted also on the case 117 through a suspension 123 adapted to move the objective lens 136 only in two directions, i.e. substantially along the normal to the recording surface of the recording medium 100 and substantially radially of the recording medium 100. Also, a coil 122 in substantially opposed relation to the magnet 121 is mounted on the objective lens 136. By supplying a current to the coil 122 and thus producing a magnetic effect, the objective lens 136 can be moved in two directions, i.e. substantially along the normal to the recording surface of the recording medium 100 and substantially radially of the recording medium 100. The rail 115, the rail guides 116, the case 117, the magnet 121, the suspension 123, the coil 122 and the objective lens 136 make up a positioning mechanism for setting the energy beam in position on the recording medium 100.

A semiconductor laser 131 constituting an energy beam generator is mounted on the case 117. The energy beam emitted from the semiconductor laser 131 is passed through a collimate lens 132, a beam splitter 133 and then through the objective lens 136. The light emitted from the objective lens 136 is partially reflected from the recording medium 100, passes through the objective lens 136, reflected from the beam splitter 133, and focused by a detection lens 134 so that the light intensity thereof is detected by a photo detector 135. The photo detector 135 has a light-receiving area segmented into a plurality of areas. The light intensity detected in each light-receiving area is amplified by an amplifier 152 while being arithmetically processed, thereby detecting the information (servo signal) on the relative positions of the light spot focused by the objective lens 136 and the recording medium 100 and an information read signal. The servo signal is sent to a servo controller 151, and the read signal is sent to a decoder 153.

Once the recording medium 100 is mounted on the information storage apparatus and the chucking mechanism 112 is fixed on the recording medium 100, the detector 140 is activated and applies the output signal thereof to a system controller 150. Upon receipt of the signal, the system controller 150 controls the motor 110 thereby to rotate the recording medium 100 at an appropriate rpm. Also, the system controller 150 controls the rotary motor 118 and thus sets the case 117 in position. Further, the system controller 150 causes the semiconductor laser 131 to emit light, while at the same time activating the servo controller 151. Thus, the rotary motor 118 is started so that the current is supplied to the coil 123 and the focus spot formed by the objective lens 136 is set in position on the recording medium 100. Then, the servo controller 151 sends a signal to the system controller 150 indicating that the focus spot is formed on the recording medium 100. The system controller 150 instructs a decoder 153 to decode the signal read out. In the case where the track read out is not the information track in the control data zone, the system controller 150 gives an instruction to the servo controller 151 to set the focus spot in position on the information track of the control data zone. As the result of this operation, the system controller 150 reads the information track of the control data zone and reads the medium information for the recording operation.

The parameters for the recording strategy described with reference to FIG. 1 are written in the information track of the control data zone. Such information as the recording power level, the temporal relation between the recording pulses and the look-up table are read by the system controller 150 from the recording medium 100. These parameters of the recording strategy are written by the system controller 150 in the parameter table of the signal processing circuit 154, the parameter table of the delay circuit 155 and the current sink amount parameter of the current sinks 156.

In the case where an instruction for information reproduction is sent from a host controller through an input connector 159, the system controller 150 instructs the servo controller 151 to set the focus spot in position on the recording medium 100. Thus, the signal produced from the photo detector 135 is decoded by the decoder 153, and then the information read is sent to the host controller through an output connector 158.

In the case where an instruction to write information and the information to be written are sent from the host controller through the input connector 159, the system controller 150 gives an instruction to the servo controller 151 to set the focus spot in position on the recording medium 100. Also, the information to be written is converted into an NRZI signal through the signal processing circuit 161. The signal thus converted into the NRZI signal is converted into a plurality of appropriate pulse chains through the signal processing circuit 154. These pulse chains are transmitted through the delay circuit 155 to the current sinks 156. The signal processing circuit 161 and the signal processing circuit 154 constitute a circuit for converting the information to be written, into a recording pulse chain.

The semiconductor laser 131 is connected to a constant-current source 157 to maintain a constant value of the total current consumed in the semiconductor laser 131 and the current sinks 156. The constant-current source 157 is connected with a plurality of the current sinks 156. Whether the current sinks 156 operate and absorb the current or not depends on the signal generated in the signal processing circuit 154 and passed through the delay circuit 155. Upon activation of the current sinks 156, the current produced from the constant-current source 157 is partially absorbed into the current sinks 156, with the result that the amount of the current flowing into the semiconductor laser 131 is reduced, thereby changing the energy level of the energy beam generated from the semiconductor laser 131.

The signal processing circuit 154 and the delay circuit 155 activate a plurality of the current sinks 156 at an appropriate timing and thus realize the recording strategy shown in FIG. 1.

For performing the aforementioned operation, the information recording apparatus is supplied with power from an external source through a terminal 160.

In the information recording apparatus described above, there are two methods for realizing the information recording method described with reference to FIG. 1.

1) The power of the energy beam emitted from the objective lens is measured by power meter thereby to measure the average power level of the first pulse, the middle pulse chain, the last pulse and the negative pulse. The power of the energy beam emitted from the objective lens can be measured by a power meter installed immediately after the objective lens or by detecting part of the light emitted from the energy beam generator. The designated values for the current sinks and the delay circuit are adjusted so that the measurement of the average energy of each pulse coincides with the corresponding designated value or each measurement is a (a: real number) times as large as the corresponding designated value. In the case where each measurement is set to a value a (a: real number) times as large as the corresponding designated value, the information is recorded in the recording medium while changing the value of a and reproduced from the recording medium. Then, the value of a is adjusted to minimize the error information detected by the decoder. Assuming that the value of a is finally determined as a1, the optimum power level of the recording pulse is a1 times the designated value. The system controller has stored therein the procedure for controlling the sequence mentioned above.

2) For the information recording apparatus lacking the function of directly measuring the average power of each pulse, the information recording method described with reference to FIG. 1 is realized in substantial manner. Specifically, a mass-produced information recording apparatus simple in construction has considerable variations in power accuracy and temporal accuracy of the recording pulse. In order to suppress these variations, the power is adjusted mutually between the first pulse, the last pulse and the negative pulse. For the middle pulse chain, on the other hand, the power is adjusted while at the same time adjusting the average power by regulation of the duty factor. As a result, it is possible to produce a superior recording waveform with the power balanced between the first pulse, the middle pulse chain, the last pulse and the negative pulse. Also, while maintaining a predetermined ratio of power between these pulses, the power level of each pulse is adjusted and the optimum power value is determined, so that an optimum recording power always suited to the recording medium can be obtained. The system controller has stored therein the procedure for controlling this sequence.

It will thus be understood from the foregoing description of the embodiment that according to the present invention, an always stable recording compatibility can be secured, and the limitation on the overshoot and the undershoot of the recording waveform can be relaxed. This facilitates the design of the recording apparatus, resulting in a high reliability and compatibility of the recording apparatus.

What is claimed is:

1. A method of recording information for forming each recording mark in a recording medium by radiating a pulse chain of an energy beam including a first pulse, a middle pulse chain, a last pulse and a negative pulse following the last pulse, comprising the steps of:

recording the designated values of the power level of the first pulse, the upper power level and the lower power level of the middle pulse chain, the power level of the last pulse and the power level of the negative pulse in the control data zone of the recording medium in advance;

adjusting the average power of said first pulse to the product of the designated pulse level value of the first pulse recorded in the control data zone and the value a, where a is a real number;

adjusting the average power of said middle pulse chain to the product of the value a and the arithmetic mean of the upper designated power level value and the lower designated power level value recorded in said control data zone;

adjusting the average power of said last pulse to the product of the designated power level value of the last pulse recorded in said control data zone and the value a;

adjusting the average power of said negative pulse to the product of the designated power level value of the negative pulse recorded in said control data zone and the value a;

adjusting the change width of the power level of the energy beam of said middle pulse train to the product of the value a and the difference between the upper designated power level value and the lower designated power level value recorded in said control data zone; and measuring the recording characteristic and the recording/reproduction characteristic while changing the value a, after adjusting the power of each of said pulse using the arbitrary value of a, and determining the value of a associated with the best recording characteristic and the best recording/reproduction characteristic thereby to determine the optimum recording power for said recording medium.

2. An information recording apparatus utilizing an information recording method which includes the steps of:

recording the designated values of the power level of the first pulse, the upper power level and the lower power level of the middle pulse chain, the power level of the last pulse and the power level of the negative pulse in the control data zone of the recording medium in advance;

adjusting the average power of said first pulse to the product of the designated pulse level value of the first pulse recorded in the control data zone and the value a, where a is a real number;

adjusting the average power of said middle pulse chain to the product of the value a and the arithmetic mean of the upper designated power level value and the lower designated power level value recorded in said control data zone;

adjusting the average power of said last pulse to the product of the designated power level value of the last pulse recorded in said control data zone and the value a adjusting the average power of said negative pulse to the product of the designated power level value of the negative pulse recorded in said control data zone and the value a adjusting the change width of the power level of the energy beam of said middle pulse train to the product of the value a and the difference between the upper designated power level value and the lower designated power level value recorded in said control data zone; and measuring the recording characteristic and the recording/reproduction characteristic while changing the value a after adjusting the power of each of said pulse using the arbitrary value of a, and determining the value of a associated with the best recording characteristic and the best recording/reproduction characteristic thereby to determine the optimum recording power for said recording medium;

the information recording apparatus comprising:

an energy beam generator, a power adjusting mechanism capable of adjusting the power level of the energy beam generated by said energy beam generator, a holding mechanism capable of holding said recording medium, a moving mechanism capable of moving said energy beam and said recording medium relatively to each other, and a signal processing circuit for converting the information to be recorded to the power level of said energy beam;

wherein said recording medium is irradiated with a pulse chain of the energy beam including a first pulse, a middle pulse chain following said first pulse, a last pulse following said middle pulse train, and a negative pulse following said last pulse when forming each recording mark on the recording medium, thereby determining the optimum energy beam power for recording the information in said recording medium using the information recording.

* * * * *